US005887514A

United States Patent [19]

Bielfeldt et al.

[11] Patent Number: 5,887,514

[45] Date of Patent: Mar. 30, 1999

[54] METHOD, FILTER PRESS AND CONTROL DEVICE FOR REDUCING THE WATER CONTENT OF SOLID MATERIALS AND/OR SLUDGES

[75] Inventors: Friedrich B. Bielfeldt, Prahl; Eckhard Kintscher, Gemmingen, both of Germany

[73] Assignee: Maschinenfabrik J. Dieffenbacher GmbH & Co., Eppingen, Germany

[21] Appl. No.: 822,945

[22] Filed: Mar. 21, 1997

[51] Int. Cl.[6] .................................. B30B 9/24; F26B 5/14

[52] U.S. Cl. .................................. 100/37; 34/86; 34/398; 34/507; 34/519; 44/626; 100/41; 100/73; 100/118; 100/152

[58] Field of Search ........................... 100/37, 41, 73–75, 100/118, 151, 152; 34/70, 73, 86, 398, 468–470, 507, 519; 44/592, 597, 626; 210/770, 771, 783

[56] References Cited

U.S. PATENT DOCUMENTS

| | | | |
|---|---|---|---|
| 4,033,253 | 7/1977 | Stollenwerk et al. | 100/118 |
| 4,702,745 | 10/1987 | Kamei et al. . | |
| 5,697,167 | 12/1997 | Kunz et al. | 34/86 |
| 5,711,086 | 1/1998 | Stubbing | 34/86 |

FOREIGN PATENT DOCUMENTS

| | | |
|---|---|---|
| 334903 | 3/1921 | Germany . |
| 339034 | 7/1921 | Germany . |
| 359440 | 9/1922 | Germany . |
| 472419 | 3/1929 | Germany . |
| 1080970 | 5/1960 | Germany . |
| 3519530 | 2/1986 | Germany . |
| 3932099 | 10/1990 | Germany . |
| 4224648 | 4/1993 | Germany . |
| 4434447 | 3/1996 | Germany . |
| 228602 | 12/1943 | Switzerland . |
| 799438 | 8/1958 | United Kingdom . |
| WO96/10064 | 4/1996 | WIPO . |
| WO 96/12923 | 5/1996 | WIPO . |

*Primary Examiner*—Stephen F. Gerrity
*Attorney, Agent, or Firm*—Foley & Lardner

[57] ABSTRACT

The invention relates to a method, a press, and a control device for reducing the capillary-bound water content in fiber cells of carbon-containing, finely comminuted solid materials and/or sludges. The method according to the invention includes rapidly raising the movable press plate of a filter press while the pressure chamber remains closed. A steam-coal dust mixture is formed due to the rapid expansion. At the same time, a first discharge lock is opened while the second discharge lock remains closed so that the exhaust steam flows in the direction of the controlled outlet valve. The exhaust steam can then be sent to a heat exchanger and then to another heat exchanger and, finally, may be reused for a subsequent operating cycle.

3 Claims, 10 Drawing Sheets

METHOD, FILTER PRESS AND CONTROL DEVICE FOR REDUCING THE WATER CONTENT OF SOLID MATERIALS AND/OR SLUDGES

BACKGROUND OF THE INVENTION

The invention relates to a method, a press and a control device for reducing the capillary-bound water content in fiber cells of carbon-containing, finely comminuted solid materials and/or sludges.

SUMMARY OF THE INVENTION

An object underlying the invention is to make it possible, by means of a new method, to use raw brown coal on a large-scale industrial basis by thermomechanical dewatering, in which the overall efficiency of the conversion in power plant processes is improved and the continuous throughput of large amounts of coal-containing solids required for this purpose is achieved. To avoid blow-off at the edges of the bulk material mat under the action of the steam pressure and to achieve a uniform distribution of thermal energy over the press surfaces without reducing the steam pressure at the edges, it is further intended to provide a technical solution for a plant and press which no longer contains, or which avoids, the disadvantages described.

In terms of the method, this object is achieved by the combination of the following process steps:

a) a starting material is used which at the beginning of the cycle is vapor-blasted in a pressure chamber, which is sealed in an essentially steam-tight manner and has been preheated to above 100° Celsius, and using a steam which has been superheated to ≧150° Celsius, b) the compacting pressure on the starting material is greater than the pressure prevailing in the starting material as a result of the bulk density, corresponding at most to approximately the steam pressure introduced of 5 bar to 8 bar, and, then c) after having reached a temperature of about ≧125° Celsius in the starting material, the injection of steam is terminated and, depending on the particle size of the starting material, a high mechanical, specific press pressure of up to at most 75 bar becomes effective, in order to effect reduction to a residual water content of up to 20 percent by weight.

The thermomechanical dewatering method as claimed in the main patent DE 1 95 35 315.3 makes it possible to dewater brown coal economically with a low consumption of thermal and mechanical energy. The overall efficiency of the power plant process for the conversion of brown coal with a high moisture content can be significantly improved by the upstream connection of the method in accordance with the invention for removing the water, which method is beneficial in terms of energy. Moreover, compared with the known thermal drying methods, the energy required to evaporate the water is cut down.

The solution in terms of the plant for carrying out the process steps as claimed in the main patent DE 1 95 35 315.3 consists in guiding a revolving scattering belt through a pressure chamber which is integrated in a single-daylight press and in opening and closing this pressure chamber by means of a lock system during the operations of the process sequence, the main components of the plant comprising a reversible, continuously operating scattering machine, a heatable, discontinuously operating filter press and a scattering belt box system with a rectangular scattering profile for the brown coal granules, the endless scattering belt of which system is guided in a revolving manner by two endless side steel belts through a pressure chamber, which can be sealed in a gastight manner, in the press, and it being possible to close and open the pressure chamber, transversely to the direction of transportation in the entrance and exit thereof, by means of a board which can be raised and lowered and a blocking slide gate.

This two-stage process of the thermomechanical dewatering has the result that, as the thermal energy is supplied by means of steam at the end of the mechanical pressing, both the coal and also the residual moisture have adopted the steam temperature in the dry brown coal pressed material in the sealed pressure chamber of the filter press, that is to say the residual moisture expands when the press plate is raised and is released as steam. Depending on the temperature (from 125° Celsius to 200° Celsius and a steam pressure of up to about 20 bar), there is therefore the problem of removing this residual moisture in a controlled manner when emptying the press. If, when the pressure chamber is closed, that is to say with deployed hydraulic bulkheads and closed locks, the upper press plate is raised, the residual moisture enclosed in the dewatered slab of brown coal is released as steam. If the press plate is opened slowly, a steam expansion pressure corresponding to the coal temperature of about 200° Celsius and about 16 bar steam pressure is set in the expansion chamber. This would have the draw-back that a removal of this expansion steam via corresponding outlet ducts would require these ducts or lines to be configured correspondingly for the high steam pressure present. Without controlled removal of the exhaust steam inside the press region, large quantities of vapors would be formed in the exit region of the filter press, which vapors would have to be captured by additional extraction devices and removed by means of extremely complex and expensive wet dust scrubbers. However, since the thermomechanical dewatering process runs discontinuously, the quantity of vapors formed (vapor is in this case a mixture of steam and coal dust) has to be fed to the wet dust scrubbing at the end of each pressing cycle by means of additional suction devices, it only being possible to take up the quantities of dust, which in addition occur discontinuously, within a relatively short time of about 5% to 10% of the overall cycle time during the emptying of the filter press. This means that the extraction devices and dust scrubbers have to be dimensioned accordingly for these quantity flows which occur for a short time, which requires a high level of investment. A further disadvantage here is that the vapor to be extracted is lost in energy terms as a quantity of heat.

The object underlying the invention is to provide a method by means of which the majority of the residual moisture remaining in the dewatered slab of brown coal at the end of the mechanical pressing can be removed, prior to emptying from the pressure chamber, in a controlled manner as steam expansion without complex suction devices and the quantity of heat contained in the residual moisture can still additionally be utilized thermally.

Two significant advantages can be gained from the rapid opening of the pressure chamber by raising the movable press plate. Owing to the higher expansion rate, a lower steam pressure is set in the steam expansion chamber, and because of the high expansion rate, the dewatered slab of brown coal (dry brown coal pressed material) is suddenly loosened by the explosion-like steam expansion pressure, that is to say the slab of brown coal adopts a loose, crumbly state corresponding to the original particle sizes of the raw brown coal granules, which is extremely advantageous for subsequent fine grinding, since as a result smaller milling units and thus less expensive machines can be used. The basic idea behind the teaching in accordance with the invention is based on the cyclically caused release of the quantity of exhaust steam heat into a water store condensate system, it then in turn being possible to feed this accumulated quantity of heat via one or more heat exchanger systems over the entire cycle time to a further utilization, for example for heating the quantity of air for the chamber of the entire plant itself and also the required quantity of air for the final drying of the dewatered and dried slab of brown coal and for heating the combustion air for the combustion chambers or the water in the turbine circuit. In addition to the utilization in terms of energy of the enthalpy heat from the exhaust steam, there results, in particular due to the combination between the cyclical release of heat of the vapor condensate and the permanent removal in the downstream heat exchanger, in the ratio of the time sequences of ten to one, significant economic advantages due to the minimization of the plant costs, likewise in a ratio of about ten to one.

Further advantages of the invention will be apparent from the following description of the drawings and the claims.

DETAILED DESCRIPTION OF THE PREFERRED EMBODIMENTS

Figure 1:
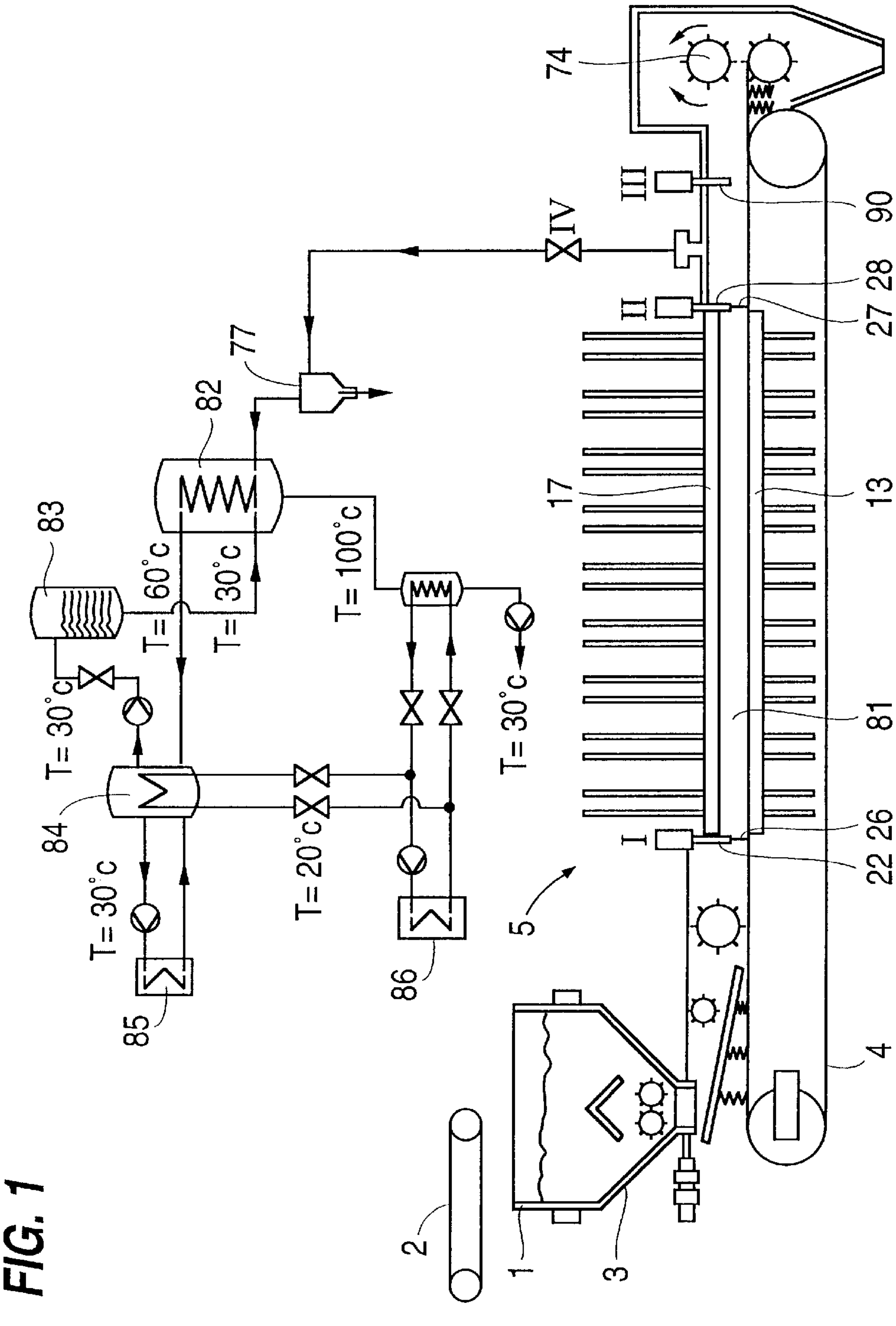
FIG. 1 shows a diagrammatic depiction of the filter press according to the invention with the feed of raw brown coal granules and the exhaust steam lock system with vapor condenser-heat exchanger system connected downstream, for carrying out the method.

The drawing according to FIG. 1 shows the subject matter of the invention, comprising the region of the plant for the method for the thermomechanical dewatering for the raw brown coal granules 6, comprising:

A) a scattering section for a discontinuous scattering of the starting material in bed form on to the scattering and feed belt 4, B) a single-daylight filter press 5 with integrated pressure chamber and lock system, and C) the transportation of the pressed slab 31 of brown coal out of the pressure chamber 40 with prebreaking device 74 for a subsequent grinding drying.

Figure 11:
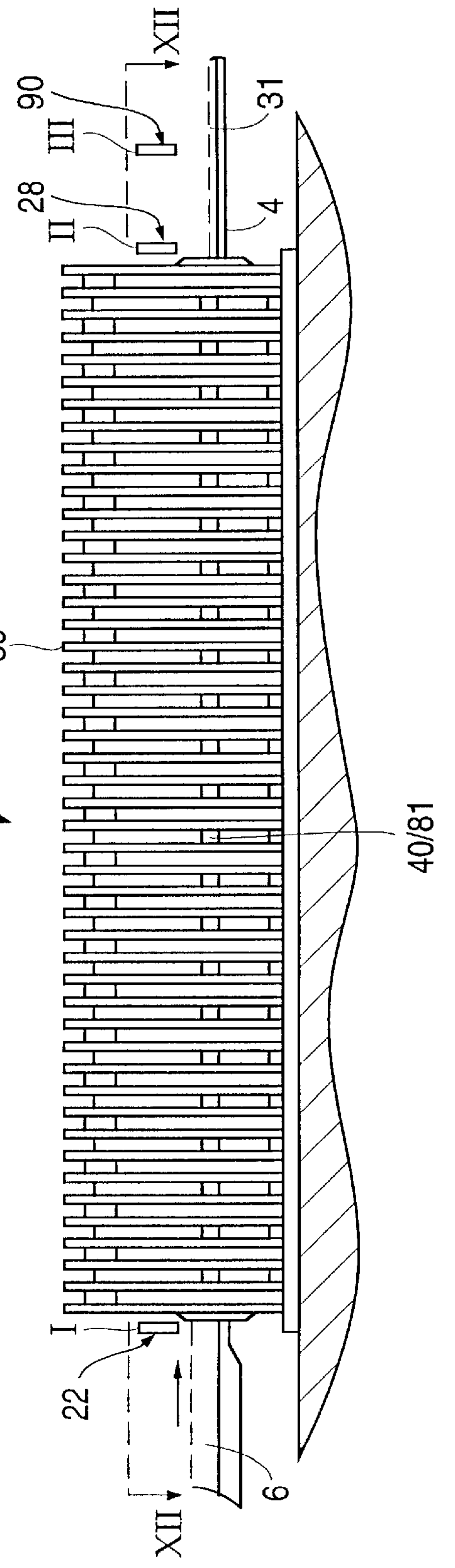
FIG. 11 shows the filter press in side view, with the locks I, II and III.
Figure 12:
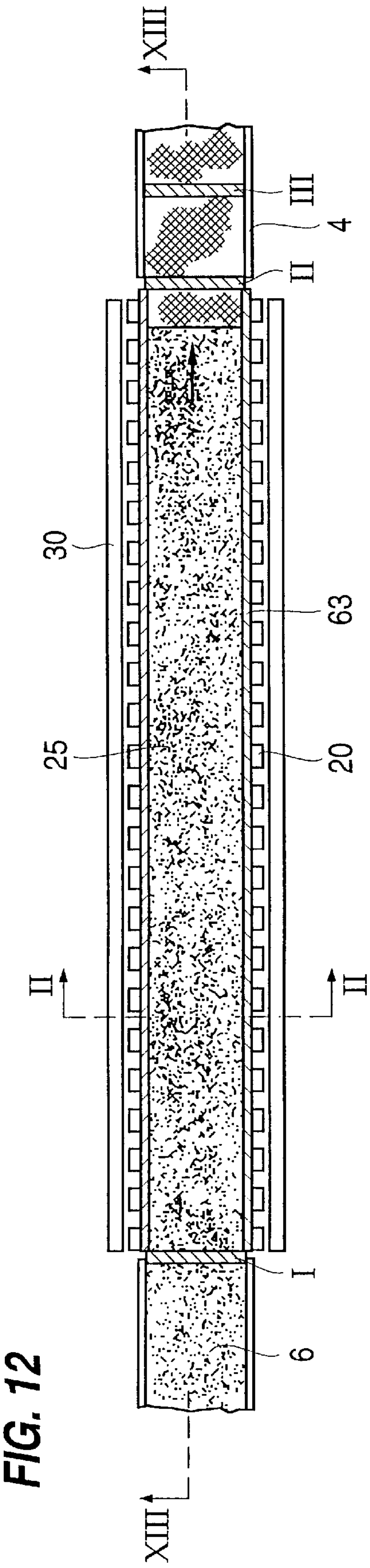
FIG. 12 shows, in a section XII—XII from FIG. 11, the filter press with the locks I, II and III, as well as the hydraulically adjustable bulkheads.

The scattering section A of FIG. 1 furthermore illustrates the continuous transfer of the raw brown coal granules 6 from the transfer belt 2 into the fixed hopper 1. The stationary scattering machine 3, which forms a structural unit with the hopper 1, scatters the raw brown coal granules 6 on to the scattering and feed belt 4, which is guided in circulation through the filter press 5. The scattering and feed belt system (cf. also FIGS. 11 and 12) comprises the lower endless scattering and feed belt 4 and the two bulkheads 63 arranged vertically fixed on the latter to the left and right inside the filter press. The scattering and feed belt 4 is in this case configured as a steam-permeable metal fabric belt and is guided running synchronously through the pressure chamber 40 of the filter press 5. The raw brown coal granules 6 are scattered up to the bulk material height H in a precisely geometrically rectangular cross section from the scattering machine 3 and are then introduced unaltered into the pressure chamber 40 and removed following pressing.

At the same time that the bed of raw brown coal granules is being filled onto the scattering and feed belt 4 and the slab 31 of brown coal is being discharged from the pressing plant, the next bed of raw brown coal granules is introduced. Before starting up the scattering and feed belt 4, the pressure chamber 40 is opened at the entrance 26 and exit 27 and the bulkheads 63 of the pressure chamber 40 are relieved of pressure, that is to say released. The bed of raw brown coal which has been poured on is transported as far as the exit 27 by means of the numerical control system of the scattering and feed belt 4. After the scattering and feed belt has reached the discharge lock II, the pressure chamber 40 is closed again, that is to say the bulkheads 63 are deployed again (pressing stroke of about 5 mm) and the entrance 26 and exit 27 are closed again.

The filter press 5 with integrated pressure chamber and lock system in the pressure chamber pressing region B is configured in accordance with the drawing as a stationary single-daylight downstroke press. The scattering and feed belt 4 is introduced continuously with the raw brown coal granules 6 from the scattering section A into the pressure chamber pressing region B, in that it slides over the lower, fixedly arranged, heated press plate 13 of the pressure chamber 40.

The pressure chamber system is in this case formed by the following functional components:

the lower, stationary press plate 13, which is mounted in the press frame 30, the vertical bulkheads 63, which stand at the two longitudinal sides of the press plate 13, are in each case arranged to the left and right and are in turn pressed laterally, by means of hydraulic short-stroke cylinders 20, against the upper press plate 17, which is driven by the hydraulic press cylinders 34, and the long-stroke cylinders 34, which act vertically from above, and the short-stroke cylinders 20, which press horizontally from both sides on to the pressure chamber 40. The cylinders 34 and 20 are in each case assigned to the press frame 30 and arranged at the longitudinal sides and end sides of the pressure chamber 40.

The bulkheads 63 inside the filter press 5 are controlled in terms of lateral pressure by means of the hydraulic short-stroke cylinders 20, that is to say they are relieved of pressure during the transporting movement of the scattering and feed belt 4 and are pressed with varying lateral compressive forces against the upper press plate 17 during the injection of steam and the pressing operation. The upper press plate 17 is sealed in a gastight manner against the steam pressure by means of an elastic rubber seal 88. The bulkheads 63 are in turn sealed in a gastight manner by elastomeric seals 89 with respect to the sealed lower edge of the press plate 13 when the bulkheads 63 are pressed down vertically on to the press plate 13 by means of the hydraulic pressing cylinders 23 when the scattering and feed belt 4 is at a standstill.

In parallel with the introduction of the scattered raw brown coal granules 6 into the pressure chamber 40, the blocking slide gate 28 in the exit 27 is moved into the closure position, by means of a vertical movement on the part of the hydraulic actuator 36, for the following steam injection process. The blocking slide gate 22 in the entrance 26 is in this case moved far enough upward by means of the hydraulic actuator 37, that is to say released, that the scattered raw brown coal granules 6 having the bulk material height H can be introduced into the pressure chamber 40 without interference.

The controlled removal of the steam expansion following the cycle of the filter press 5 from the pressure chamber 40 is now carried out, according to the invention, by means of the following procedure for a controlled lock system in the exit region of the pressure chamber 40 in accordance with FIGS. 1, 6 and 7, functioning as follows:

With the pressure chamber 40 still closed, the movable press plate 17 opens rapidly. The starting position for this corresponds to FIG. 6. Due to the explosion-like loosening, a steam-coal dust mixture is formed in the steam expansion chamber 81; it should be noted that when the filter press 5 is closed, the pressure chamber 40 is referred to, and when the filter press 5 is open, the steam expansion chamber 81 is referred to. As the press plate 17 begins to rise, or at least at the end of this movement, the discharge lock II is opened. Since the discharge lock II is designed with a blocking slide gate 28 over the entire width of the press, a large expansion cross section can thus suddenly be opened in the direction of the vapor condenser 82. In this operation in accordance with FIG. 7, the discharge lock III with the blocking slide gate 90 remains closed as before, so that the exhaust steam flows in the direction of the controlled outlet valve 80. The opening rates of the discharge lock II and the outlet valve 80 are controlled such that a controlled steam flow rate is set in the passage cross sections of these slide units, as a result of which increased quantities of coal dust and granules resulting from excessive flow rates are prevented from being supplied to the vapor condenser 82. As a rule, the opening of the press plate 17, the discharge lock II and the outlet valve 80 is controlled to be staggered in terms of time, in a serial connection with one another, so that with the exhaust steam 93 arising in batches, the expansion evaporation time can be set in a controlled manner to be approximately ≦10% of the overall cycle time in the removal of the exhaust steam 93 to the vapor condenser 82, without entraining large amounts of coal dust and granules.

The vapor condenser system functions as follows: During the steam expansion time of ≦10% of the overall cycle time, the exhaust steam 93 flows into the vapor condenser 82. During this time, a corresponding amount of water flows by the force of gravity out of a water container 83, which is arranged above the vapor condenser 82, through the vapor condenser 82 and accumulates the heat liberated; if, for example, a quantity of water is fed from the water container at a temperature of 30° Celsius, then the water in the condenser pipe of the vapor condenser 82 will adopt a temperature of about 60° Celsius. This quantity of water is now fed to a heat exchanger 84, with the advantage that the stored heat can then be released from this heat exchanger 84 to further external heat exchanger systems 85 and 86 virtually continuously over the entire cycle time. As a result, the entire system can be of correspondingly smaller and less expensive design. As a further advantage, the quantity of condensate from the steam expansion quantity, which has a water temperature of 100° Celsius, can likewise be utilized in terms of energy by the heat exchanger system 86. A solids separator 77 for collecting any entrained coal dust and granules is collected upstream of the complete vapor condenser system. Due to the expansion over the large cross sections of the discharge lock II and the expansion lock IV to the vapor condenser 82, the pressure gradient of, for example, ≦10 bar in the steam expansion chamber 81 to the vapor condenser 82 results in an expansion to atmospheric pressure, that is to say no additional extraction device is required. Following the steam expansion time of ≦10% of the overall cycle time, the additional lock III in accordance with FIG. 7 is opened using the blocking slide gate 90 and the filter press 5 can be emptied as depicted in FIGS. 13 and 14.

Figure 5:
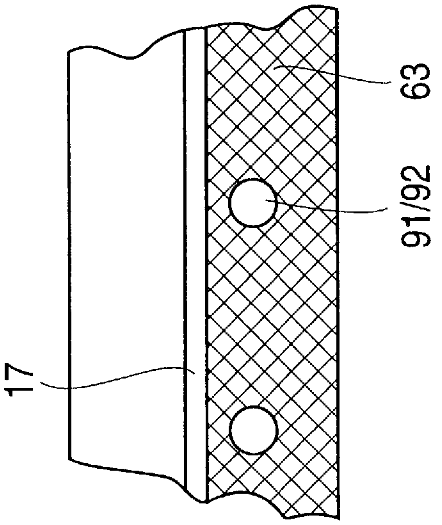
FIG. 5 shows, in a section V—V from FIG. 2, the assignment of the cylindrical valve bodies.
Figure 2:
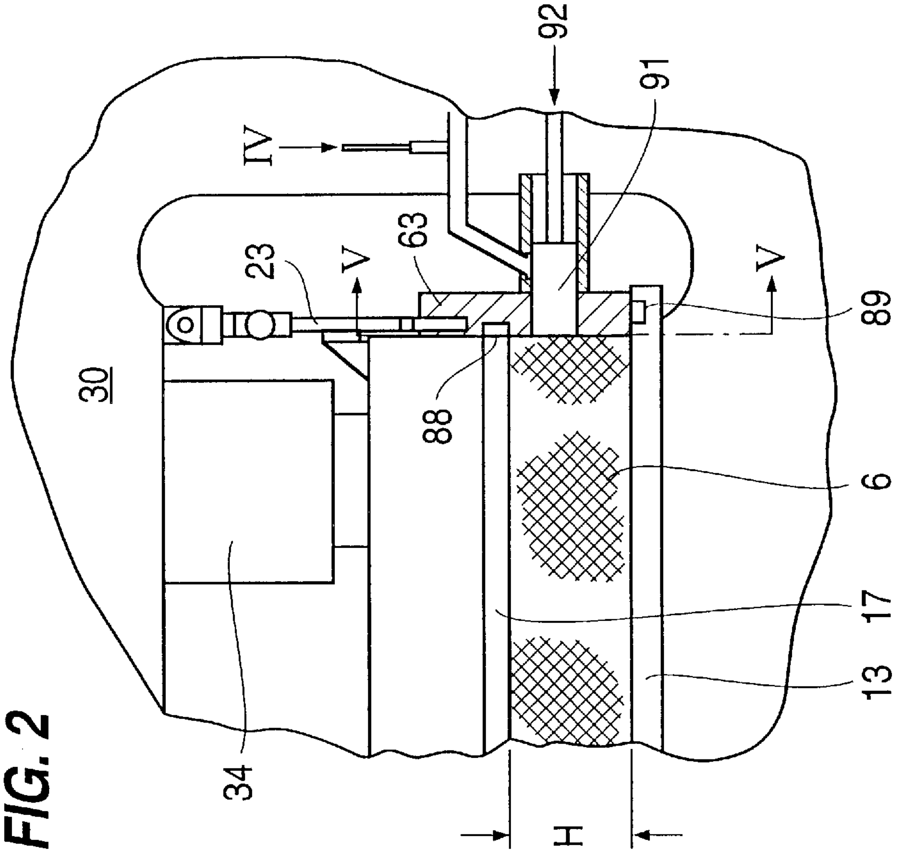
FIG. 2 shows a section II—II from FIG. 12, as an alternative to the lock system according to FIGS. 6 and 7.
Figure 4:
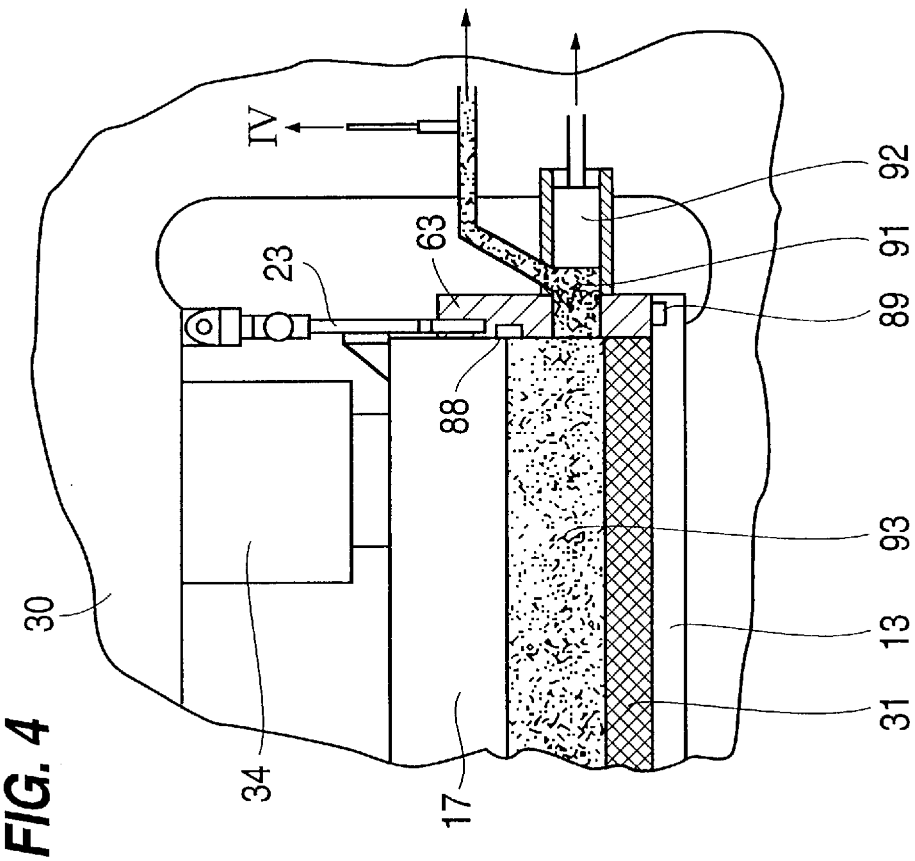
FIG. 4 shows the exhaust steam expansion in the steam expansion chamber of the filter press with the outlet valve open.
Figure 3:
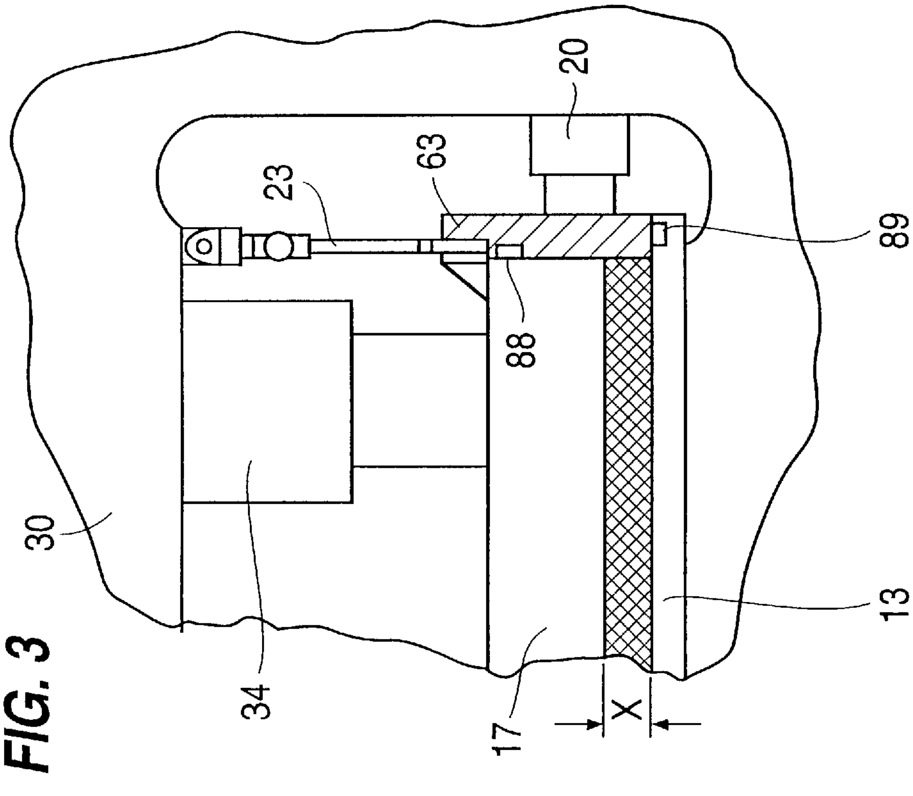
FIG. 3 shows the situation in accordance with section II—II according to FIG. 12, but at the end of the mechanical compaction for pressing out hot water.
Figure 13:
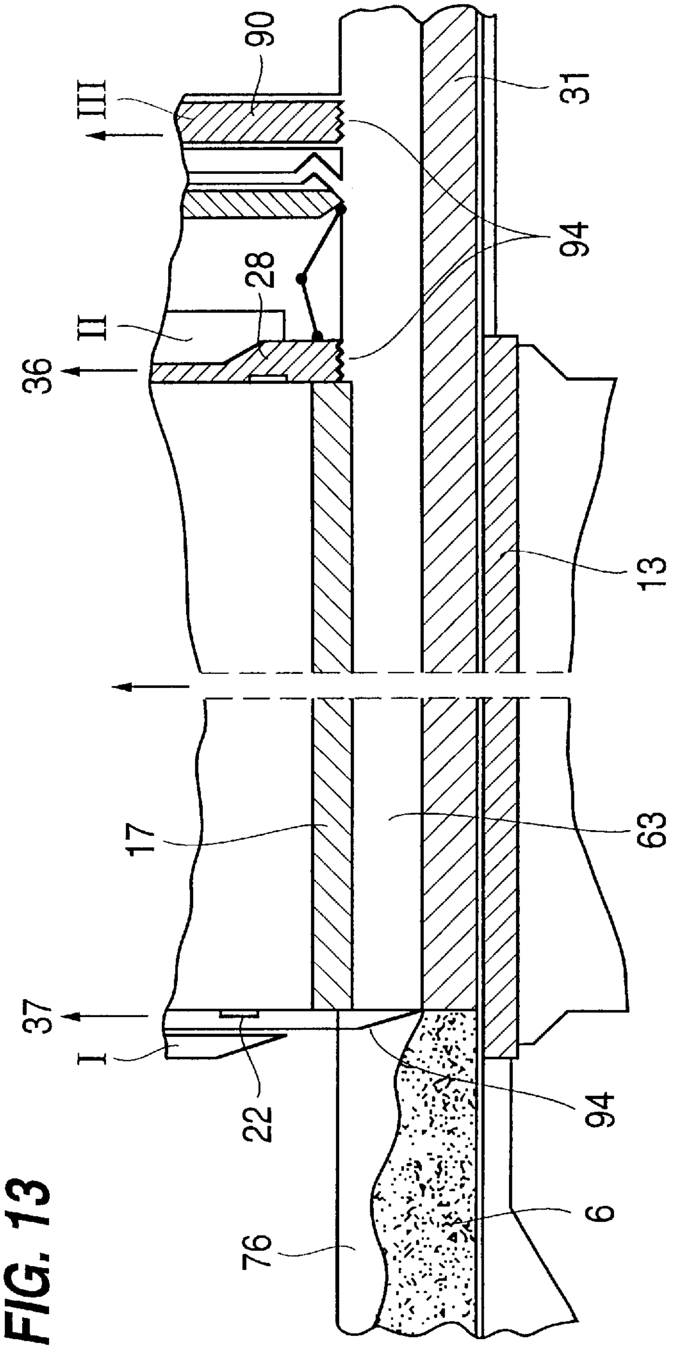
FIG. 13 shows, in a section XIII—XIII from FIG. 12, the operating situation where all the locks I, II and III are open and the emptying or feeding of the pressure chamber has begun.
Figure 14:
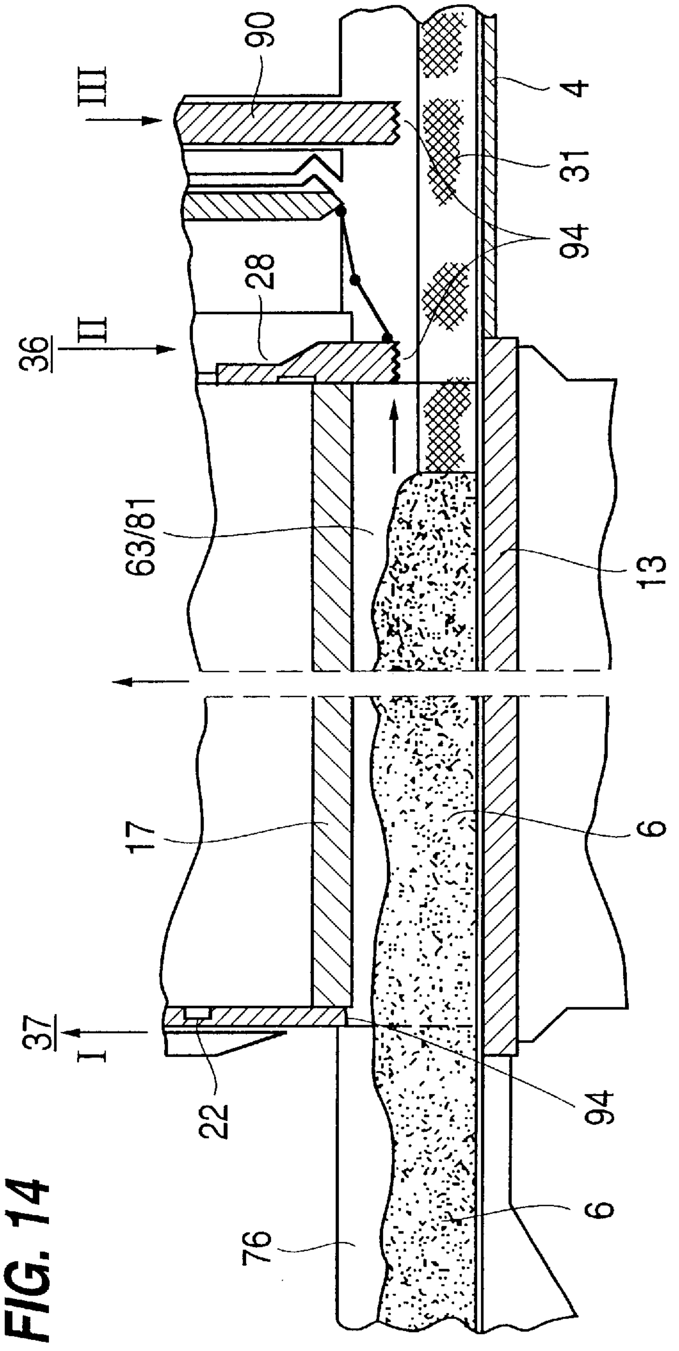
FIG. 14 shows the feeding of the filter press shortly before the end of this operation according to FIG. 13.

A second alternative solution is depicted in the embodiment in accordance with FIGS. 2, 4 and 5, which functions as follows:

During the feeding of the filter press 5 in accordance with FIG. 13 and during the dewatering operation as far as final compaction in accordance with FIG. 3, cylindrical outlet openings 91, which are arranged in the hydraulically adjustable bulkheads 63, are closed. According to FIGS. 2, 4 and 5, any desired number of these cylindrical outlet openings 91 may be arranged between the hydraulic actuators 20, specifically in such a number that a sufficiently large outlet cross section as described above can be opened during the steam expansion phase in accordance with FIG. 4. The advantage of this configuration compared to the alternative described above lies in the fact that, in the case of extremely long filter presses 5, the opening cross sections on both longitudinal sides of the pressure chamber 40 can be arranged in a correspondingly large number and the expansion of the exhaust steam 93 toward the expansion lock IV is provided. The cylindrical design of the closure ram results in a self-cleaning effect for the outlet openings 91. The expansion lock IV is in turn assigned to the closure rams 92 in the outlet openings 91, so that the sequence of the method is carried out similarly to as described with regard to FIGS. 6 and 7.

Figure 10:
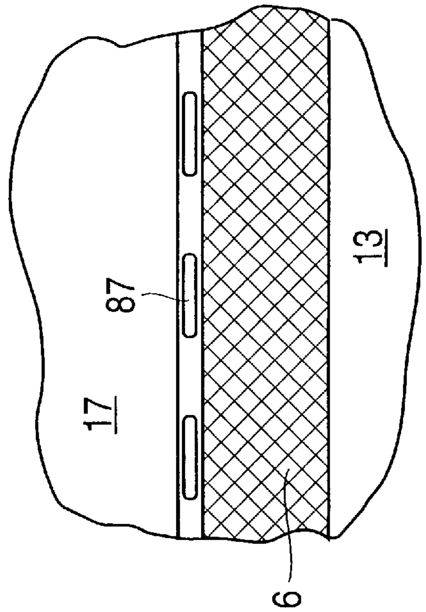
FIG. 10 shows a section X—X from FIG. 8 with the arrangement of the upper slots in the bulkheads.
Figure 8:
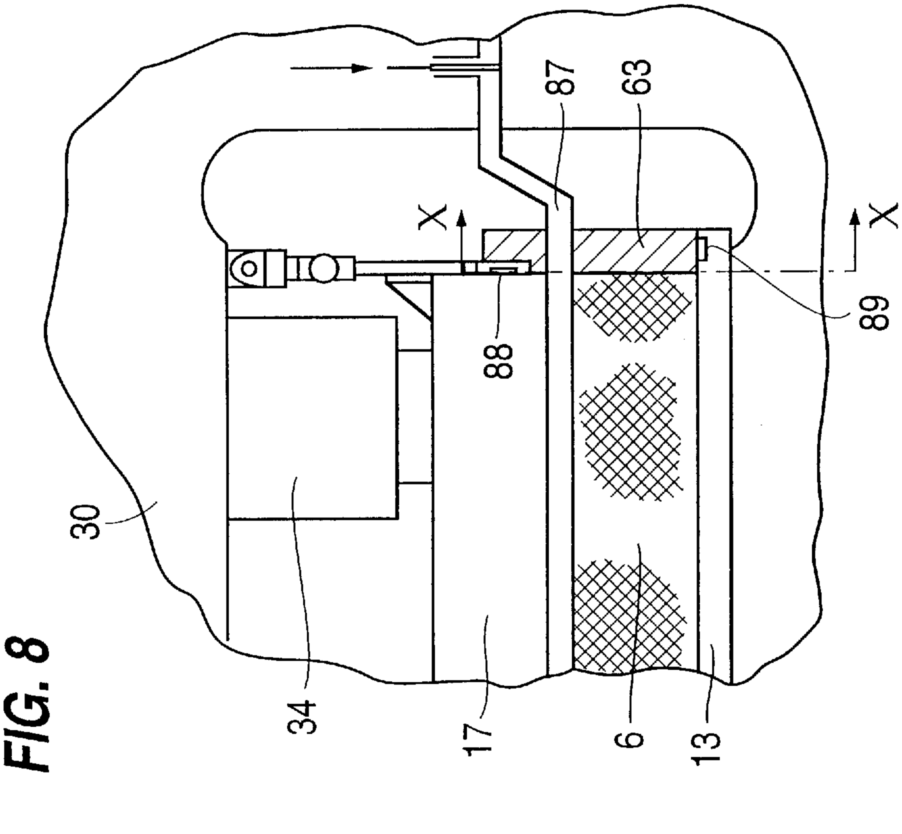
FIG. 8 shows an alternative to the configuration in accordance with FIG. 2 and FIG. 6 of the exhaust steam lock system.
Figure 9:
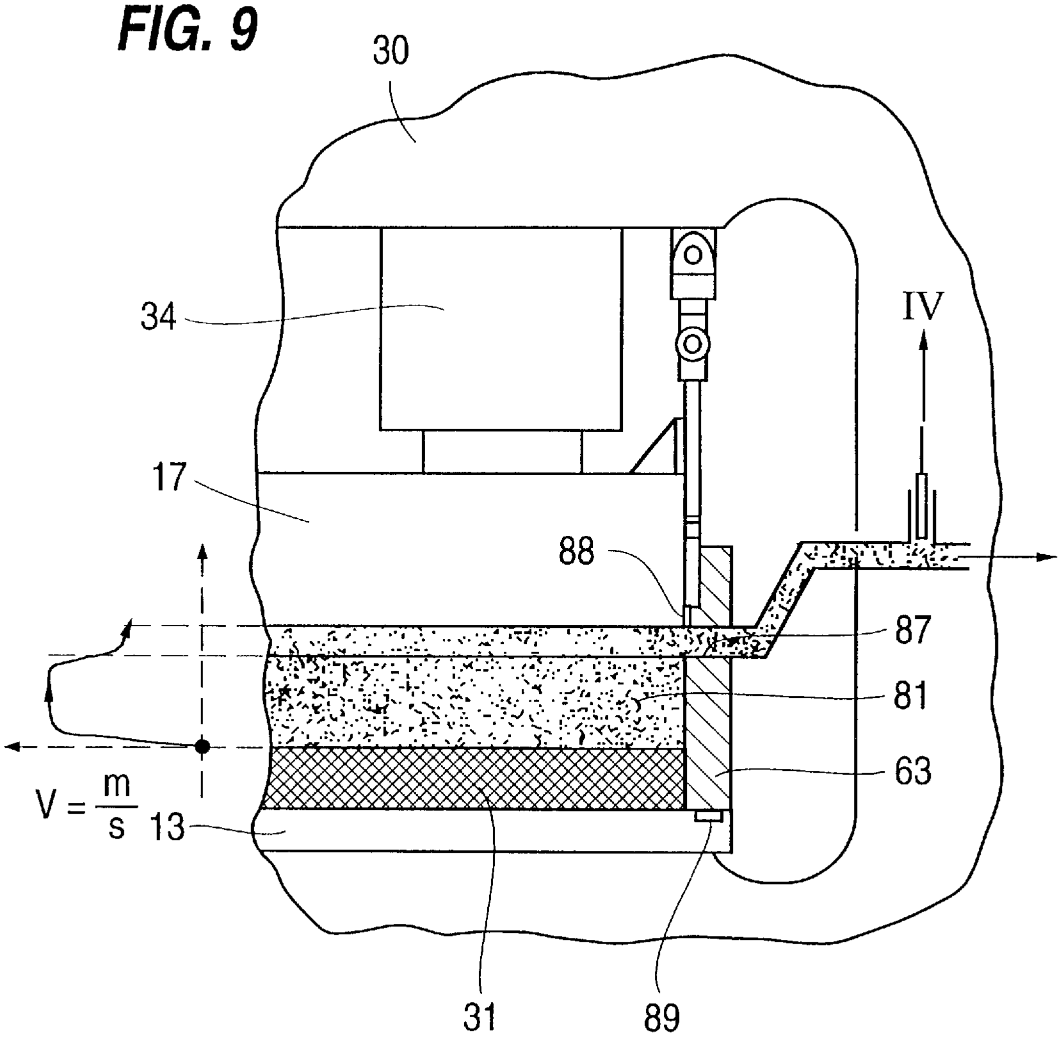
FIG. 9 shows the steam expansion situation with the pressure chamber open.

As an alternative to the configuration in accordance with FIGS. 2 to 5, a further alternative solution is illustrated in FIGS. 8, 9 and 10, which functions as follows:

FIG. 8 shows the feed situation similarly to FIG. 13. That is to say, longitudinal slots 87 are arranged in the lateral, hydraulically adjustable bulkheads 63 above the bulk material height H of the raw brown coal granules 6, which slots are closed automatically during the pressing operation, that is to say the downward movement of the press plate 17.

In the steam expansion situation according to FIG. 9, the lateral longitudinal slots 87 automatically become free when the press plate 17 opens, so that the exhaust steam 93 can be fed to the vapor condenser 82 via the expansion lock IV.

Figure 6:
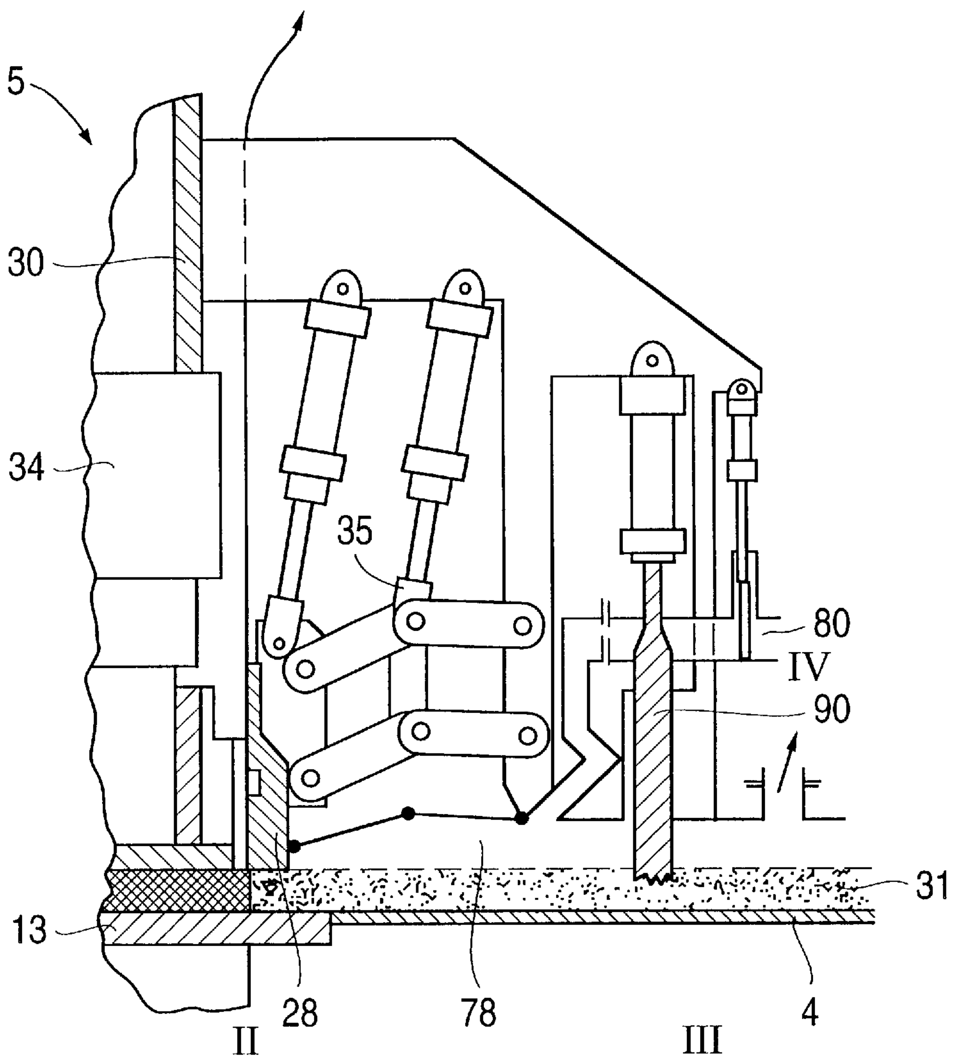
FIG. 6 shows the exhaust steam lock system at the exit of the filter press at the end of the mechanical final compaction similar to FIG. 3.
Figure 7:
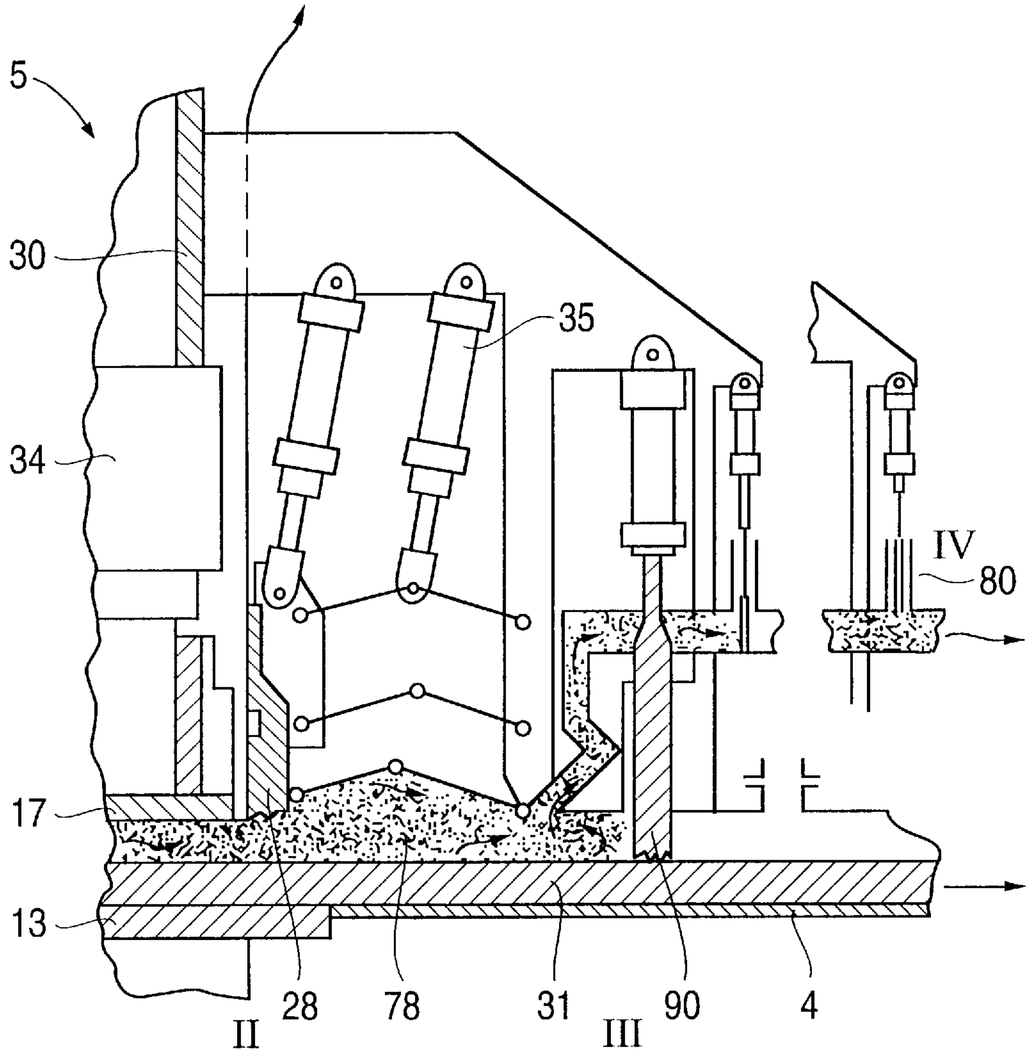
FIG. 7 shows the exhaust steam lock system according to FIG. 6 with the press ram raised similarly to FIG. 4 and the discharge lock II open similarly to the outlet ram according to FIG. 4.

From the velocity curve drawn in FIG. 9 of the press plate 17, it can be seen that a very high opening rate is set at the start of the opening operation, but when the slits 87 are reached, the rate of the press plate 17 is suddenly decelerated, so that, as described already in FIGS. 6 and 7, a controlled steam expansion rate in the direction of the vapor condenser 82 is set.

The configuration of the sealing system for the pressure chamber 40 in the filter press 5 is described below. In all the use examples, the method steps in the removal of steam expansion are carried out with a pressure chamber 40 enclosed on all sides. Only the press plate 17 moves within the raw brown coal and dry brown coal region, as a result of which the side walls of the press plate 17 and the inner walls of the adjustable bulkheads 63 and the blocking slide gates 22 and 28 are subject to a natural wearing load from the material being pressed. The press plate 17 with its rectangular, vertical walls on all sides is thus formed as a smooth steel body. The sealing elements are arranged on the outer walls, that is to say on the hydraulically adjustable bulkheads 63 and the blocking slide gates 22 and 28 of the entry lock I and the discharge lock II, specifically in the upper region of these hydraulically adjustable walls, so that in the raised position of the press plate 17 the seal 88 always acts in the wear-free region. In the case of the lateral bulkheads 63, the seal 88 with respect to the press plate 17 is situated in the upper region of the bulkheads 63 and the seal 89 with respect to the lower press plate 13 is situated in the lower region of the bulkhead 63. The arrangement of the seals 88 and 89 is selected such that, by means of the hydraulic actuator 20 via the bulkheads 63, either the seal 88 is pressed against the press plate 17 and the lower seal 89 is pressed against the fixed press plate 13, so that an automatic seal is produced. In the lock system described, for example FIGS. 6 and 7, the upper seal is pressed by the locking mechanism 35 against the vertical wall of the press plate 17, and an automatic sealing is effected in the lower region, for example on the coal itself, in that the blocking slide gates 22 and 28 are pressed by their lower end faces 94 vertically on to the respective bed of coal by means of the hydraulic actuators 36.

What is claimed is:

1. A method for reducing the capillary-bound water content in fiber cells of carbon-containing, finely comminuted solid materials and/or sludges comprising:

a) preheating a pressure chamber to above 100° Celsius;

b) vapor blasting a starting material in a pressure chamber, wherein the pressure chamber is sealed in an essentially steam-tight manner;

c) using the action of thermal energy and pressure on the starting material
wherein the thermal energy comprises superheated steam and the pressure is supplied by a mechanical energy being supplied to and exerted on the starting material in the pressure chamber,
wherein the superheated steam has been superheated to above 150° Celsius, and
wherein the compacting pressure on the starting material is greater than or equal to the pressure prevailing in the starting material as a result of the bulk density, which is at most approximately 5 bar to 8 bar;

d) after reaching a temperature of about≧125° Celsius in the starting material, stopping the injection of steam and increasing the pressure on the starting material to a maximum pressure that is determined in accordance with grain size of the starting material e) expanding an exhaust steam, which is formed after a filter press is opened, in a chamber;

f) opening the chamber,
wherein the exhaust steam flows off therefrom into a vapor condenser at a controlled expansion rate.

2. A method for reducing the capillary-bound water content in fiber cells of carbon-containing, finely comminuted solid materials and/or sludges as claimed in claim 1 further comprising the steps of g) releasing an exhaust steam heat formed after each operating cycle into a first water condensate store system;

h) transferring the exhaust steam heat into one or more heat exchanger systems; and i) supplying the exhaust steam heat for further utilization.

3. The method as claimed in claim 2, wherein the amount of exhaust steam heat formed is passed discontinuously into a first water store condensate system, corresponding to about 10% of the time of an operating cycle, and wherein the amount of heat of the first water store condensate system is transferred continuously into a second water store condensate system.

* * * * *